United States Patent

Kohno

[11] Patent Number: 5,872,659
[45] Date of Patent: Feb. 16, 1999

[54] ZOOM LENS SYSTEM

[75] Inventor: Tetsuo Kohno, Toyonaka, Japan

[73] Assignee: Minolta Co., Ltd., Osaka, Japan

[21] Appl. No.: 786,804

[22] Filed: Jan. 21, 1997

[30] Foreign Application Priority Data

Jan. 24, 1996 [JP] Japan .................................. 8-009905

[51] Int. Cl.$^6$ .............................................. G02B 15/14
[52] U.S. Cl. ......................................................... 359/683
[58] Field of Search ..................................... 359/683, 676

[56] References Cited

U.S. PATENT DOCUMENTS

| | | | |
|---|---|---|---|
| 5,042,927 | 8/1991 | Ogawa et al. . | |
| 5,185,678 | 2/1993 | Arimoto | 359/683 |
| 5,189,557 | 2/1993 | Endo | 359/683 |
| 5,606,460 | 2/1997 | Ohtake | 359/683 |
| 5,666,229 | 9/1997 | Ohtake | 359/683 |

FOREIGN PATENT DOCUMENTS 63-208015  8/1988  Japan .

*Primary Examiner*—Scott J. Sugarman
*Attorney, Agent, or Firm*—Price, Gess & Ubell

[57] ABSTRACT

A zoom lens system of the present invention comprises, from the object side, a first positive lens unit, a second negative lens unit, a third positive lens unit, a fourth positive lens unit and a fifth negative lens unit, wherein all of the lens units move toward the object during zooming from the shortest focal length condition toward the longest focal length condition, and said zoom lens system meets the following conditions.

$$-0.30 < f2/f1 < -0.10 \quad (1)$$

$$1.25 < \beta 5T/\beta 5W < 2.00 \quad (2)$$

$$0.25 < (\beta 5T \cdot \beta 2W)/(\beta 2T \cdot \beta 5W) < 0.65 \quad (3)$$

$$-1.20 < f12W/fw < -0.60 \quad (4)$$

where, f1: focal length of the first lens unit;

f2: focal length of the second lens unit;

fw: shortest focal length of the entire system;

β5W: horizontal magnification of the fifth lens unit in the shortest focal length condition;

β5T: horizontal magnification of the fifth lens unit in the longest focal length condition;

β2W: horizontal magnification of the second lens unit in the shortest focal length condition;

β2T: horizontal magnification of the second lens unit in the longest focal length condition; and f12W: combined focal lengths of the first lens unit and the second lens unit in the shortest focal length condition.

9 Claims, 12 Drawing Sheets

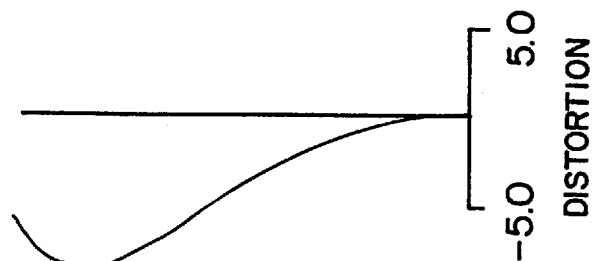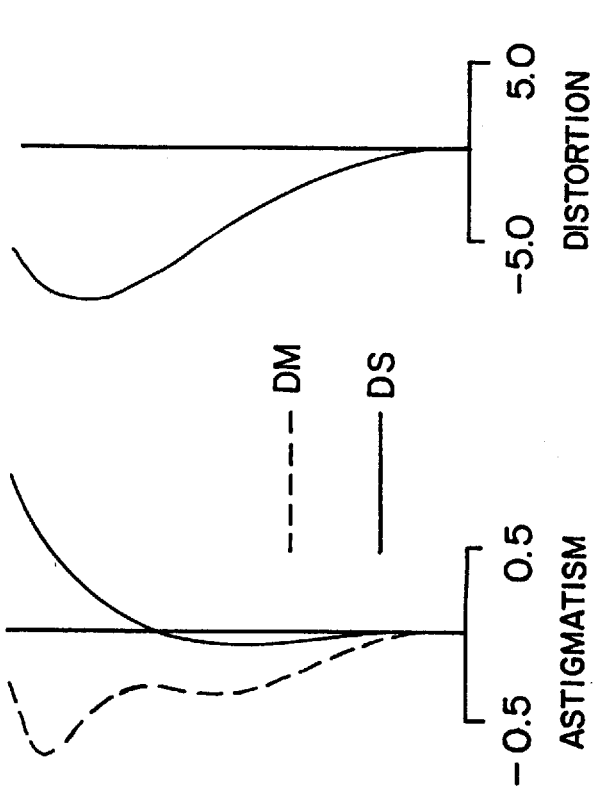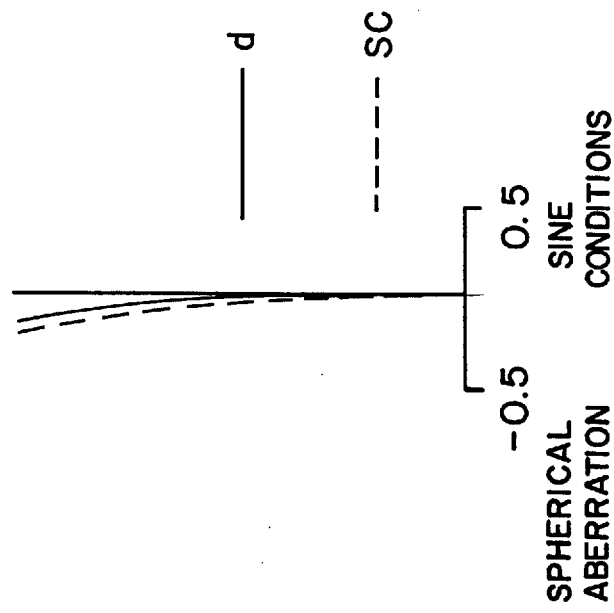

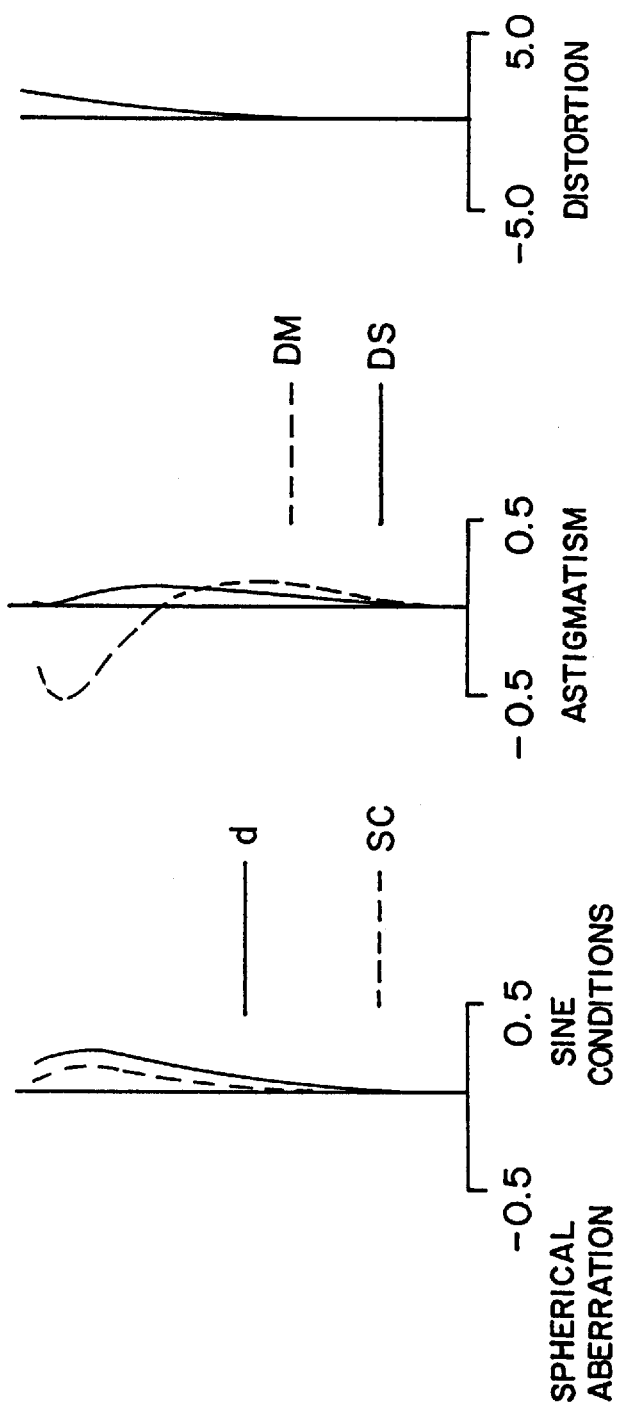

Y' = 17.2

Y' = 17.2

FNO = 7.20

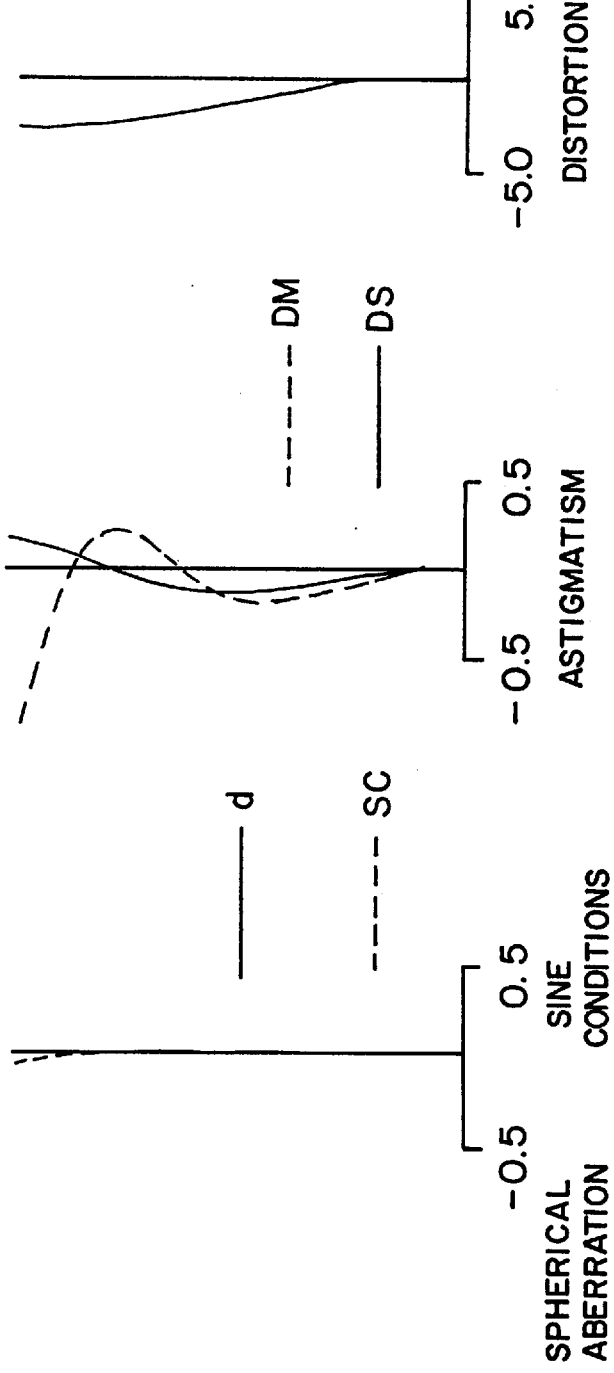

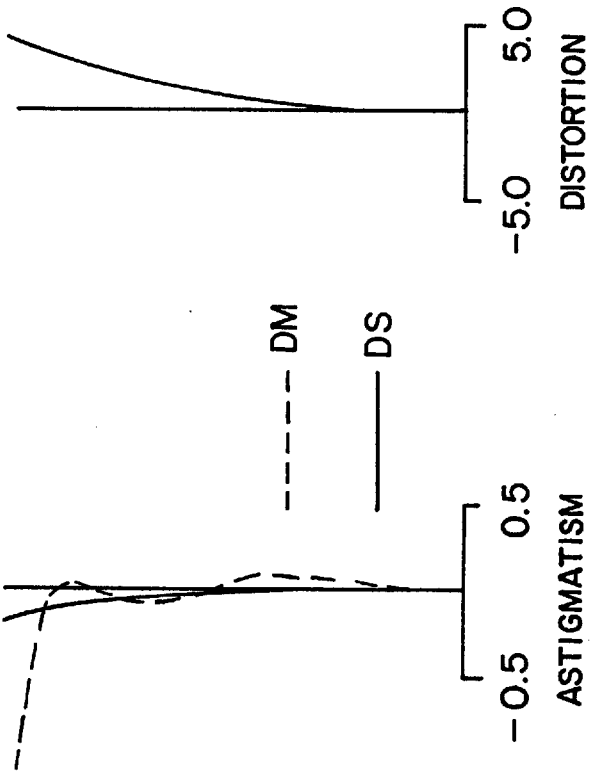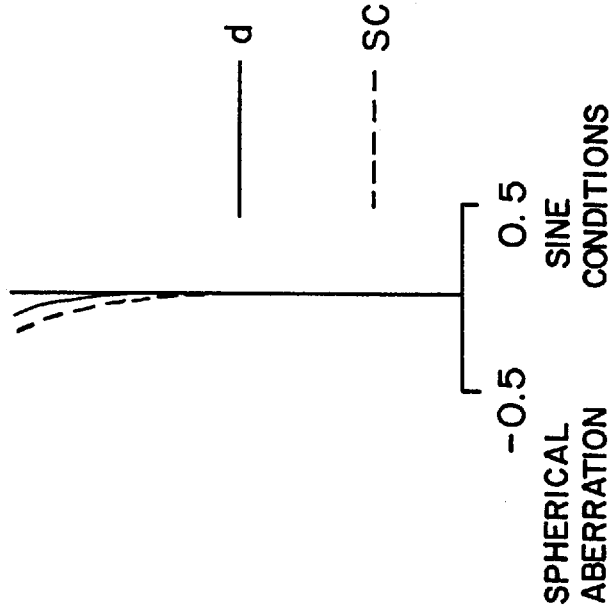

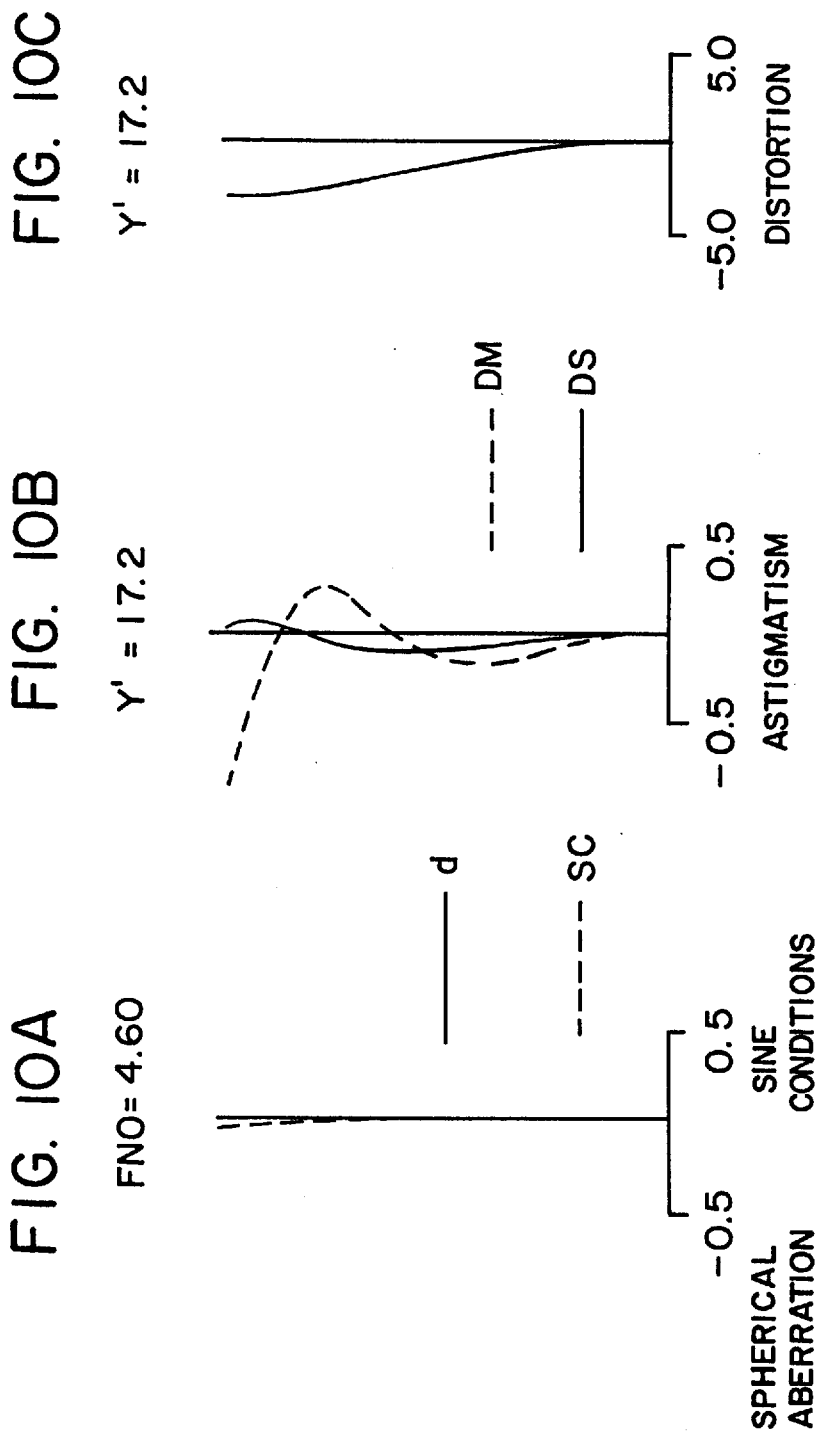

Y' = 17.2

Y' = 17.2

FNO=6.20

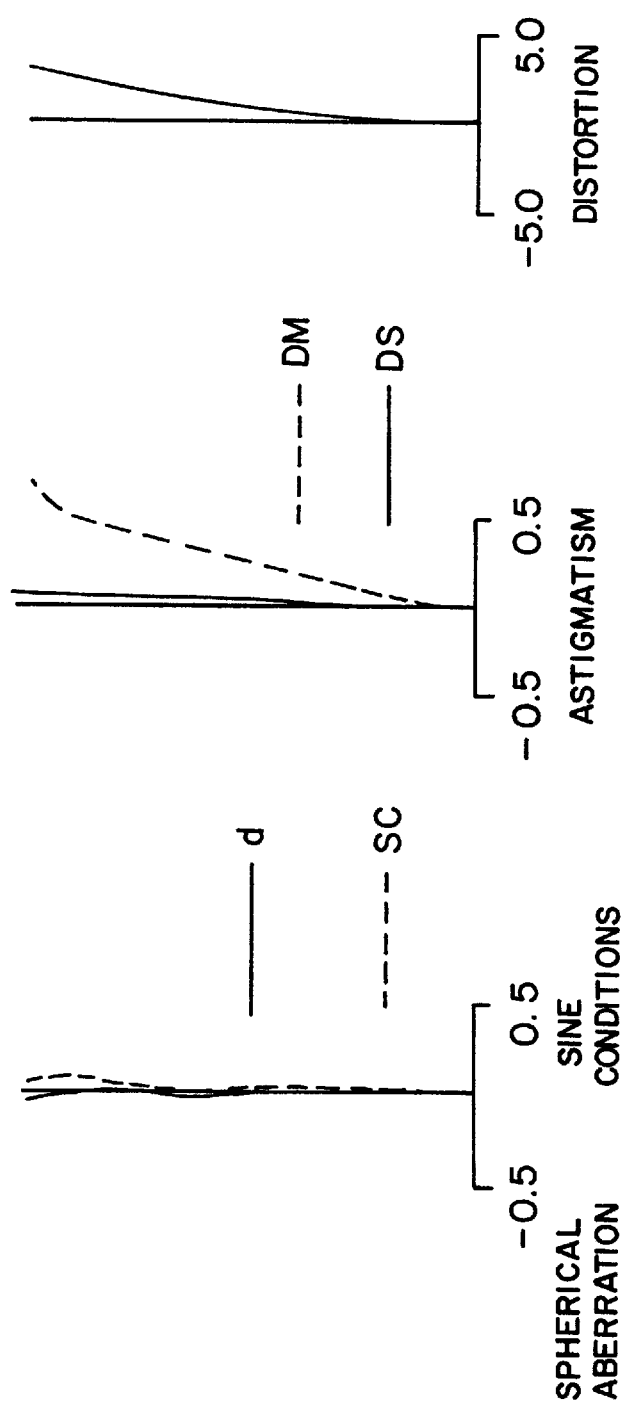

ZOOM LENS SYSTEM

BACKGROUND OF THE INVENTION

Field of the Invention

The present invention relates to a zoom lens system, and more particularly to a zoom lens system that is capable of high magnification exceeding seven times.

In recent years, zoom lens systems have become increasingly high power, and various zoom lens systems capable of high magnification (in excess of seven times, for example) have been proposed.

However, if a zoom lens system is made high-power, aberration correction becomes difficult. Consequently, conventional high-power zoom lens systems comprise many lenses in order to properly correct aberration, but this has led to an increase in size.

SUMMARY OF THE INVENTION

The present invention was made in consideration of the problem described above. An object of the present invention is to provide a compact high-power zoom lens system in which various types of aberration can be effectively corrected.

In order to achieve the object described above, a zoom lens system of the present invention comprises, from the object side, a first lens unit, a second lens unit, a third lens unit, a fourth lens unit and a fifth lens unit, wherein all of the lens units move toward the object and the distance between the fourth lens unit and the fifth lens unit decreases during zooming from the shortest focal length condition (the wide angle condition) toward the longest focal length condition (the telephoto condition), and said zoom lens system meets the following conditions.

$$-0.30 < f2/f1 < -0.10 \quad (1)$$

$$-0.75 < f2/fw < -0.40 \quad (2)$$

where, f1: focal length of the first lens unit;
f2: focal length of the second lens unit; and
fw: shortest focal length of the entire system.

Furthermore, in order to achieve the object described above, a zoom lens system of the present invention also comprises, from the object side, a first lens unit, a second lens unit, a third lens unit, a fourth lens unit and a fifth lens unit, wherein all of the lens units move toward the object during zooming from the shortest focal length condition (the wide angle condition) toward the longest focal length condition (the telephoto condition), and said zoom lens system meets the following conditions.

$$-0.30 < f2/f1 < -0.10 \quad (1)$$

$$1.25 < \beta 5T/\beta 5W < 2.00 \quad (2)$$

$$0.25 < (\beta 5T \cdot \beta 2W)/(\beta 2T \cdot \beta 5W) < 0.65 \quad (3)$$

$$-1.20 < f12W/fw < -0.60 \quad (4)$$

where, f1: focal length of the first lens unit;
f2: focal length of the second lens unit;
fw: shortest focal length of the entire system;

$\beta 5W$: horizontal magnification of the fifth lens unit in the shortest focal length condition;
$\beta 5T$: horizontal magnification of the fifth lens unit in the longest focal length condition;
$\beta 2W$: horizontal magnification of the second lens unit in the shortest focal length condition;
$\beta 2T$: horizontal magnification of the second lens unit in the longest focal length condition; and
f12W: combined focal lengths of the first lens unit and the second lens unit in the shortest focal length condition.

BRIEF DESCRIPTION OF THE DRAWINGS

These and other objects and features of the present invention will be apparent from the following description with reference to the accompanying drawings.

FIGS. 4A, 4B and 4C show aberrations in the shortest focal length condition regarding the first embodiment.

FIGS. 5A, 5B and 5C show aberrations in the middle focal length condition regarding the first embodiment.

FIGS. 7A, 7B and 7C show aberrations in the shortest focal length condition regarding the second embodiment.

FIGS. 8A, 8B and 8C show aberrations in the middle focal length condition regarding the second embodiment.

FIGS. 10A, 10B and 10C show aberrations in the shortest focal length condition regarding the third embodiment.

FIGS. 12A, 12B and 12C show aberrations in the longest focal length condition regarding the third embodiment.

DETAILED DESCRIPTION OF THE INVENTION

The embodiment of the present invention will be explained in detail below.

Figure 1:
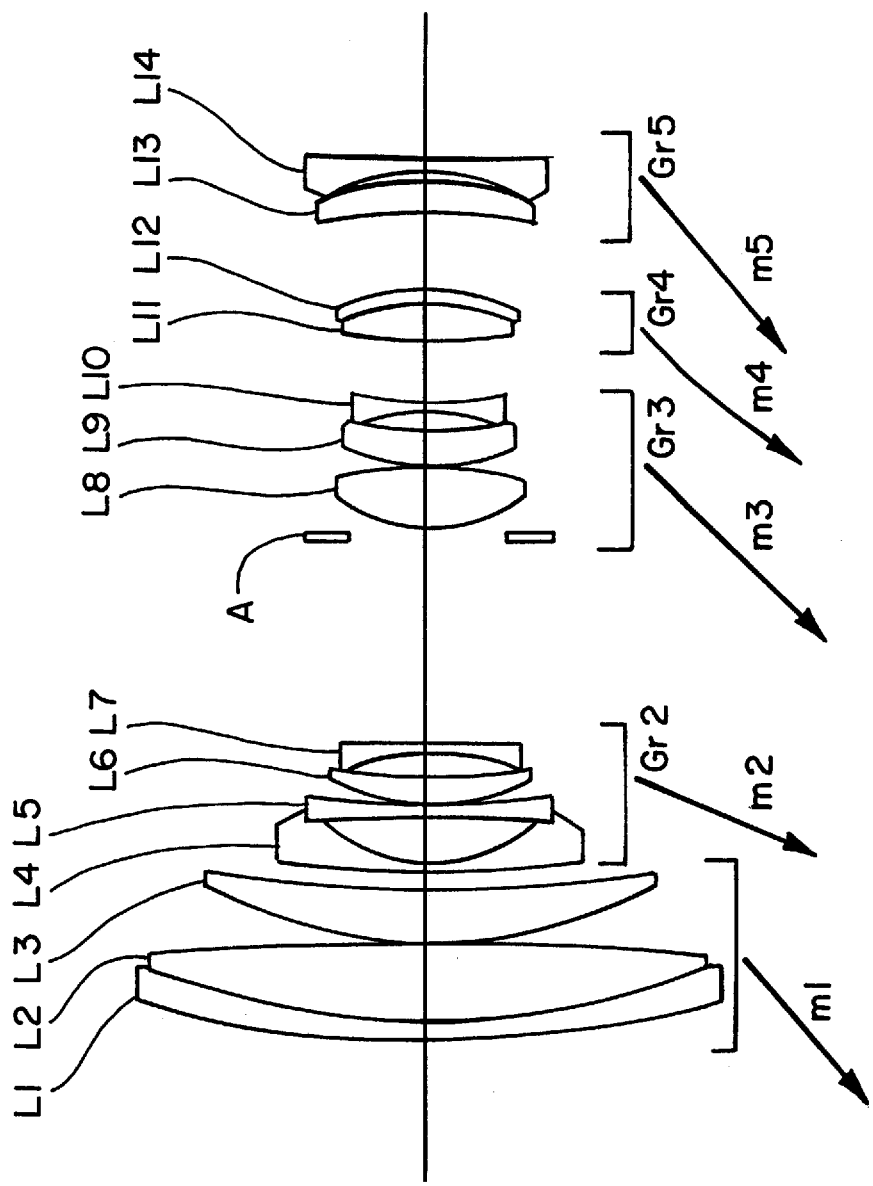
FIG. 1 shows the construction of the lenses in a first embodiment of the present invention.
Figure 2:
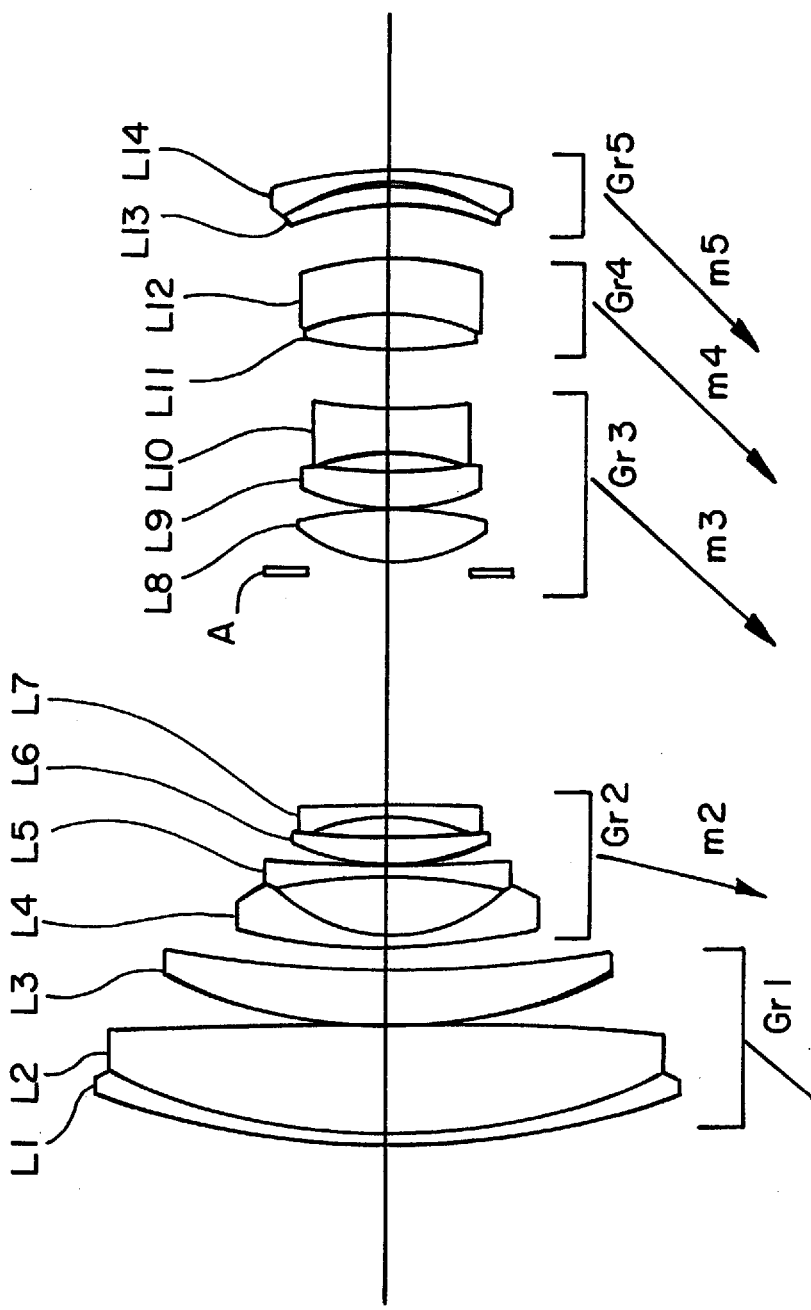
FIG. 2 shows the construction of the lenses in a second embodiment of the present invention.
Figure 3:
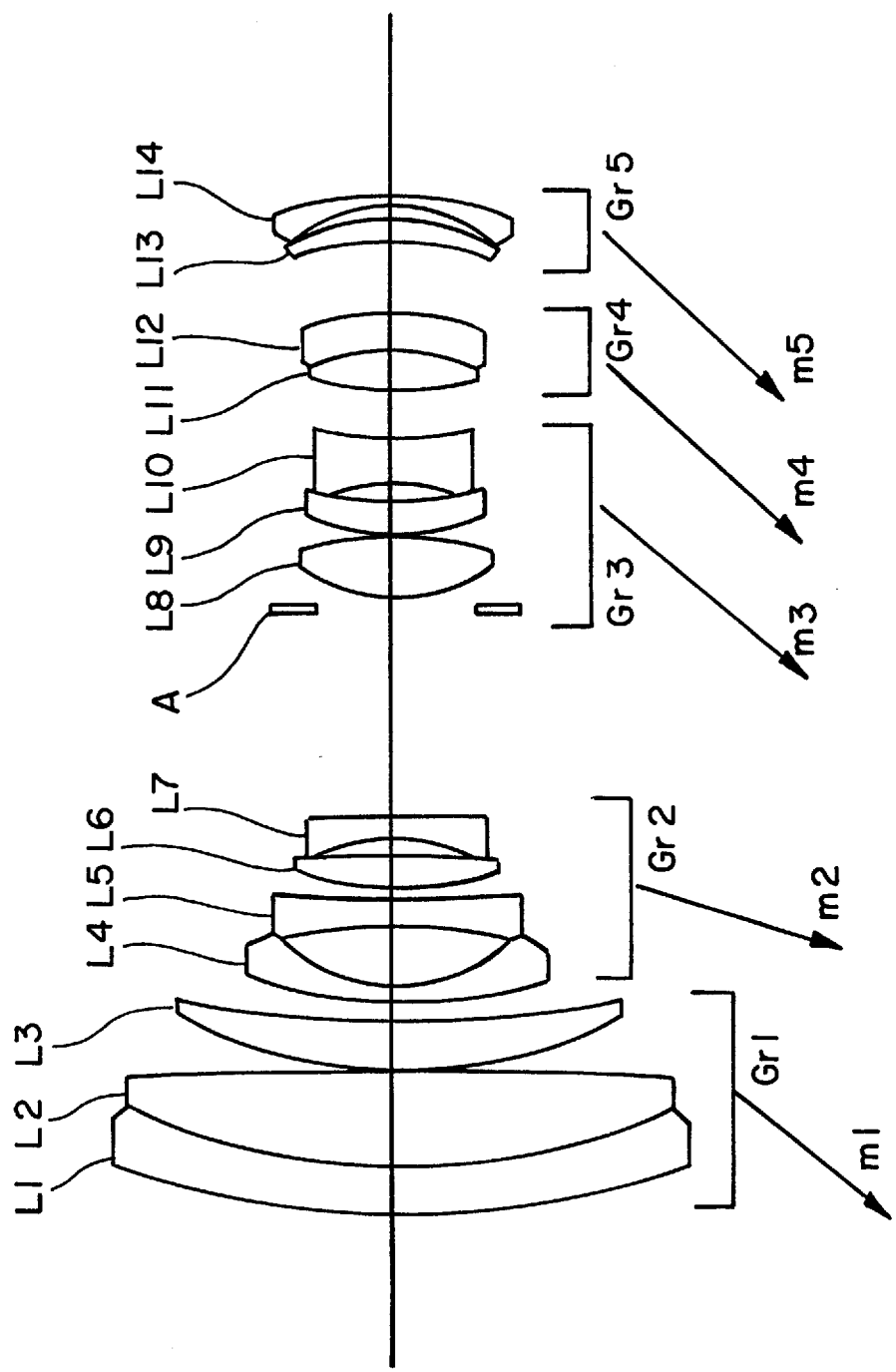
FIG. 3 shows the construction of the lenses in a third embodiment of the present invention.
Figure 6C:
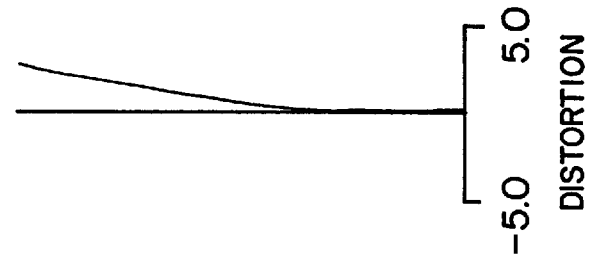
FIGS. 6A, 6B and 6C show aberrations in the longest focal length condition regarding the first embodiment.
Figure 6B:
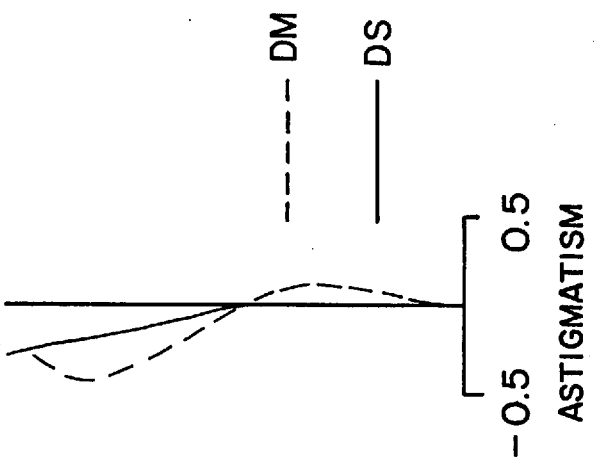
Figure 6A:
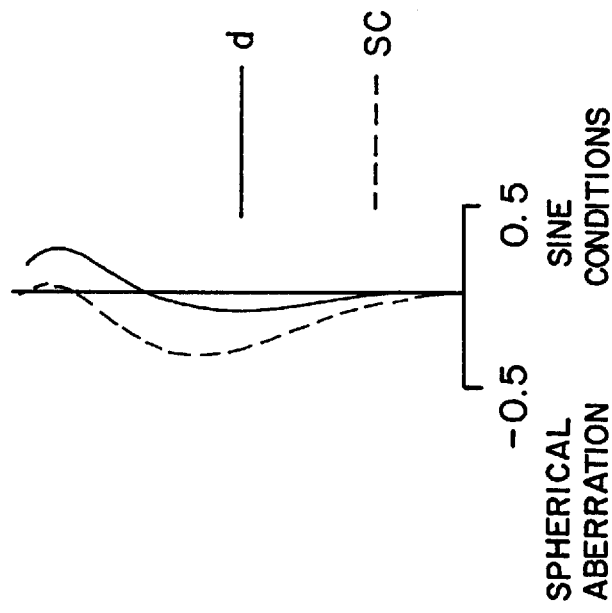
Figure 9C:
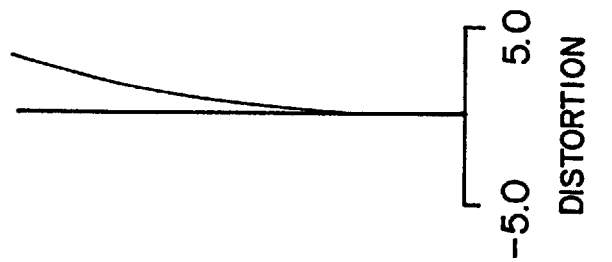
FIGS. 9A, 9B and 9C show aberrations in the longest focal length condition regarding the second embodiment.
Figure 9B:
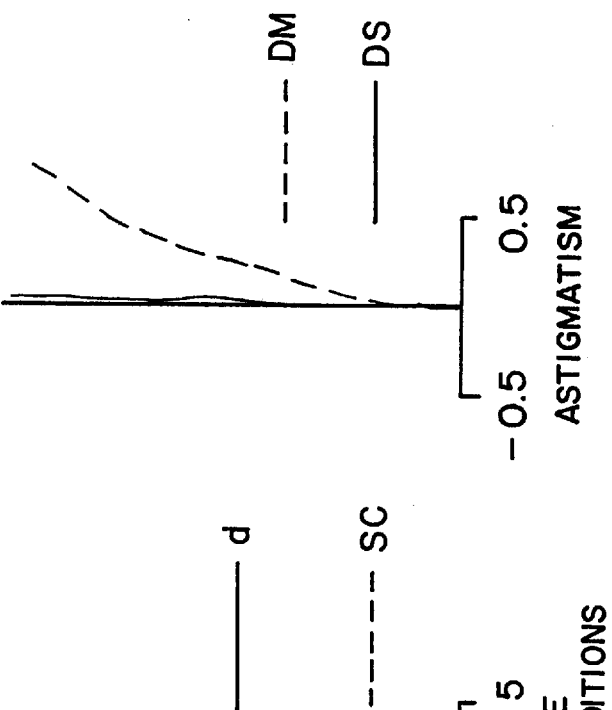
Figure 9A:
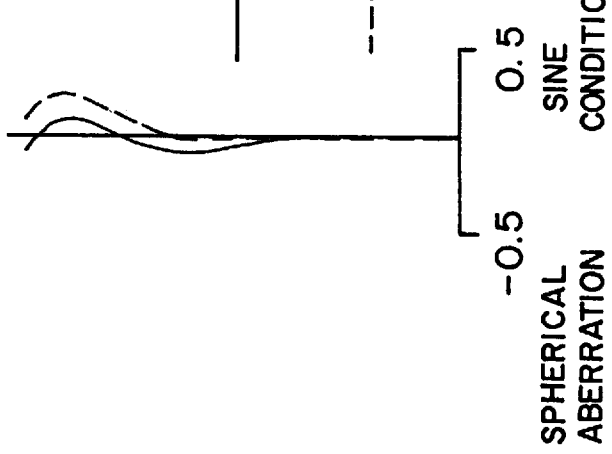
Figure 11C:
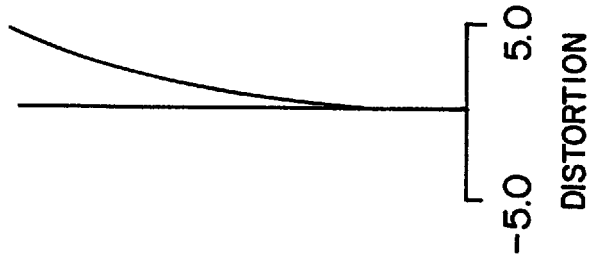
FIGS. 11A, 11B and 11C show aberrations in the middle focal length condition regarding the third embodiment.
Figure 11B:
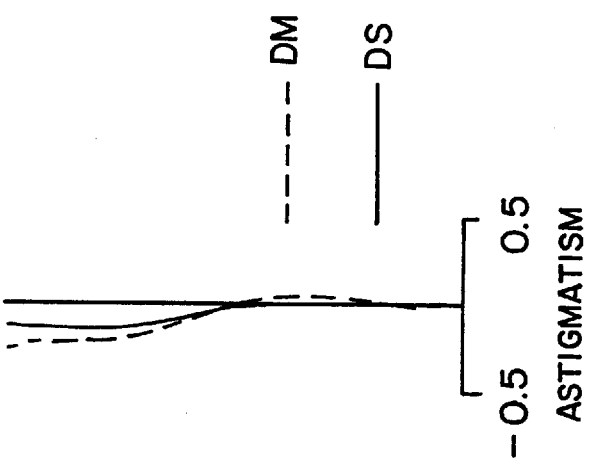
Figure 11A:
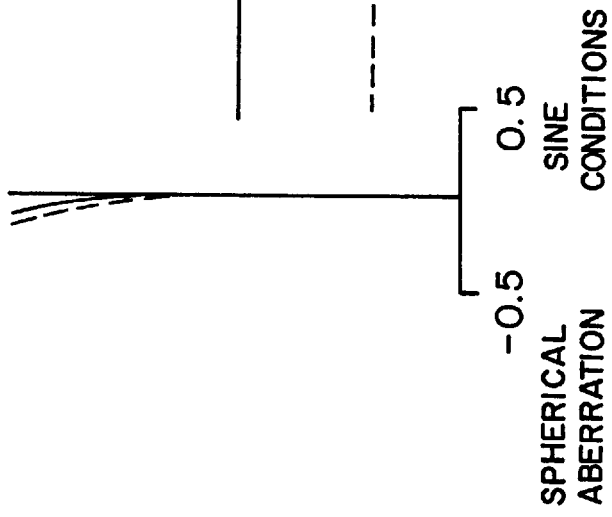

Tables 1 and 2 show the first embodiment, tables 3 and 4 show the second embodiment, and table 5 and 6 show the third embodiment. And FIGS. 1 through 3 show the construction of the lenses in the first through third embodiments of the present invention in the shortest focal length condition, respectively. Arrows m1 through m5 in FIGS. 1 through 3 indicate in a simplified manner the movements of first lens unit Gr1 through fifth lens unit Gr5 from the shortest focal length condition (w) toward the longest focal length condition (T), respectively. In each embodiment, ri (i=1, 2, 3, ...) represents the radius of curvature of the ith lens surface from the object side; di (i=1, 2, 3, ...) represents the ith axial distance from the object side; and Ni (i=1, 2, 3, ...) and vi (i=1, 2, 3, ...) represent the refractive index and the Abbe number with regard to the d-line ($\lambda$=587.56 nm) of the ith lens from the object side, respectively. Focal length f and F-number FNO of the entire lens system in the shortest focal length condition (W), middle focal length condition (M) and longest focal length condition (T) are also shown.

In each embodiment, the surfaces marked with asterisks in the radius of curvature column are aspherical. The configuration of an aspherical surface is defined by the following equation.

$$Y = \frac{C \cdot X^2}{1 + \sqrt{1 - \epsilon \cdot X^2 \cdot C^2}} + \sum_i Ai \cdot X^i$$

Where,

X: height in a direction vertical to the optical axis;

Y: amount of displacement from the reference surface along the optical axis;

C: paraxial radius of curvature;

ε: quadratic surface parameter; and

Ai: ith aspherical coefficient.

The first embodiment comprises, from the object side, first lens unit Gr1 having a positive refractive power, second lens unit Gr2 having a negative refractive power, third lens unit Gr3 having a positive refractive power, fourth lens unit Gr4 having a positive refractive power, and fifth lens unit Gr5 having a negative refractive power. First lens unit Gr1 comprises a combination lens consisting of first lens L1 which is a negative meniscus lens having a convex surface on the object side and second lens L2 having convex surfaces on both sides, and third lens L3 which is a positive meniscus lens having a convex surface on the object side. Second lens unit Gr2 comprises fourth lens L4 which is a negative meniscus lens having a convex surface on the object side, fifth lens L5 having convex surfaces on both sides, sixth lens L6 which is a positive meniscus lens having a convex surface on the object side, and seventh lens L7 having concave surfaces on both sides. Third lens unit Gr3 comprises aperture A, eighth lens L8 having convex surfaces on both sides, ninth lens L9 which is a positive meniscus lens having a convex surface on the object side, and tenth lens L10 having concave surfaces on both sides. Fourth lens unit Gr4 comprises a combination lens consisting of eleventh lens L11 having convex surfaces on both sides and twelfth lens L12 which is a negative meniscus lens having a concave surface on the object side. Fifth lens unit Gr5 comprises thirteenth lens L13 which is a positive meniscus lens having a concave surface on the object side and fourteenth lens L14 having concave surfaces on both sides.

The second embodiment comprises, from the object side, first lens unit Gr1 having a positive refractive power, second lens unit Gr2 having a negative refractive power, third lens unit Gr3 having a positive refractive power, fourth lens unit Gr4 having a positive refractive power, and fifth lens unit Gr5 having a negative refractive power. First lens unit Gr1 comprises a combination lens consisting of first lens L1 which is a negative meniscus lens having a convex surface on the object side and second lens L2 having convex surfaces on both sides, and third lens L3 which is a positive meniscus lens having a convex surface on the object side. Second lens unit Gr2 comprises fourth lens L4 which is a negative meniscus lens having a convex surface on the object side, fifth lens L5 having convex surfaces on both sides, sixth lens L6 which is a positive meniscus lens having a convex surface on the object side, and seventh lens L7 having concave surfaces on both sides. Third lens unit Gr3 comprises aperture A, eighth lens L8 having convex surfaces on both sides, ninth lens L9 which is a positive meniscus lens having convex surface on the object side, and tenth lens L10 having concave surfaces on both sides. Fourth lens unit Gr4 comprises a combination lens consisting of eleventh lens L11 having convex surfaces on both sides and twelfth lens L12 which is a negative meniscus lens having a concave surface on the object side. Fifth lens unit Gr5 comprises thirteenth lens L13 which is a positive meniscus lens having a concave surface on the object side and fourteenth lens L14 which is a negative meniscus lens having a concave surface on the object side.

The third embodiment comprises, from the object side, first lens unit Gr1 having a positive refractive power, second lens unit Gr2 having a negative refractive power, third lens unit Gr3 having a positive refractive power, fourth lens unit Gr4 having a positive refractive power, and fifth lens unit Gr5 having a negative refractive power. First lens unit Gr1 comprises a combination lens consisting of first lens L1 which is a negative meniscus lens having a convex surface on the object side and second lens L2 having convex surfaces on both sides, and third lens L3 which is a positive meniscus lens having a convex surface on the object side. Second lens unit Gr2 comprises fourth lens L4 which is a negative meniscus lens having a convex surface on the object side, fifth lens L5 having convex surfaces on both sides, sixth lens L6 which is a positive meniscus lens having a convex surface on the object side, and seventh lens L7 which is a negative meniscus lens having a concave surface on the object side. Third lens unit Gr3 comprises aperture A, eighth lens L8 having convex surfaces on both sides, ninth lens L9 which is a positive meniscus lens having a convex surface on the object side and tenth lens L10 having convex surfaces on both sides. Fourth lens unit Gr4 comprises a combination lens consisting of eleventh lens L11 having convex surfaces on both sides and twelfth lens L12 which is a negative meniscus lens having a concave surface on the object side. Fifth lens unit Gr5 comprises thirteenth lens L13 which is a positive meniscus lens having a concave surface on the object side and fourteenth lens L14 which is a negative meniscus lens having a concave surface on the object side.

The first through third embodiments all meet conditions (1) through (5) shown below.

$$-0.30 < f2/f1 < -0.10 \tag{1}$$

$$-0.75 < f2/fw < -0.40 \tag{2}$$

$$1.25 < \beta 5T/\beta 5W < 2.00 \tag{3}$$

$$0.25 < (\beta 5T \cdot \beta 2W)/(\beta 2T \cdot \beta 5W) < 0.65 \tag{4}$$

$$-1.20 < f12W/fw < -0.60 \tag{5}$$

where, f1: focal length of the first lens unit;

f2: focal length of the second lens unit;

fw: shortest focal length of the entire system;

β5W: horizontal magnification of the fifth lens unit in the shortest focal length condition;

β5T: horizontal magnification of the fifth lens unit in the longest focal length condition;

β2W: horizontal magnification of the second lens unit in the shortest focal length condition;

β2T: horizontal magnification of the second lens unit in the longest focal length condition; and f12W: combined focal lengths of the first lens unit and the second lens unit in the shortest focal length condition.

Condition (1) establishes the condition to maintain the refractive power of first lens unit Gr1 and the refractive power of second lens unit Gr2 at appropriate levels in a five-component zoom lens system comprising lens units that are aligned to be positive, negative, positive, positive and negative in terms of refractive power. If the upper limit of condition (1) is exceeded, the refractive power of first lens unit Gr1 becomes too weak, and therefore the length of the entire system would increase when it is zoomed into the telephoto range. If the lower limit of condition (1) is not exceeded, the refractive power of first lens unit Gr1 becomes too strong. While this is advantageous in reducing the length of the entire system, the diameters of the front lenses would increase in order to secure extra-axial light rays in the wide angle range, and aberration correction would become difficult.

Condition (2) establishes the refractive power of second lens unit Gr2 which plays an important role in a five-component zoom lens system comprising lens units that are aligned to be positive, negative, positive, positive and negative in terms of refractive power.

If the upper limit of condition (2) is exceeded, the refractive power of second lens unit Gr2 becomes too strong, which is not desirable in terms of aberration correction. In particular, spherical aberration would receive excessive correction, and distortion in the wide angle range would also increase. If the lower limit of condition (2) is not exceeded, the refractive power of second lens unit Gr2 becomes too weak. Consequently, the amount of movement of second lens unit Gr2 during zooming would increase, which would increase the length of the entire system and an increase in front lens diameters.

Condition (3) establishes the contribution to the magnification performed by fifth lens unit Gr5, which is responsible for relatively more aberration in a five-component zoom lens system comprising lens units that are aligned to be positive, negative, positive, positive and negative in terms of refractive power. If the upper limit of condition (3) is exceeded, the contribution of fifth lens unit Gr5 to the magnification becomes too large, and consequently, aberration fluctuation due to zooming would increase, which would lead to an increase in the number of lenses as well as in the length of the entire system. If the lower limit of condition (3) is not exceeded, the contribution of fifth lens unit Gr5 to the magnification decreases excessively. As a result, the contributions of other lens units to the magnification would increase excessively.

Condition (4) establishes the ratio of contribution to the magnification performed by second lens unit Gr2 and fifth lens unit Gr5 in a five-component zoom lens system comprising lens units that are aligned to be positive, negative, positive, positive and negative in terms of refractive power. It is a condition to maintain a balance between aberration fluctuation and the amounts of movement of the lens units during zooming. If the upper limit of condition (4) is exceeded, the contribution by fifth lens unit Gr5 to the magnification becomes too large in comparison with second lens unit Gr2, and therefore aberration fluctuation due to zooming would increase. On the other hand, if the lower limit of condition (4) is not exceeded, the contribution by second lens unit Gr2 to the magnification becomes too large in comparison with fifth lens unit Gr5, and therefore the amount of movement of second lens unit Gr2 during zooming would increase, which would increase the length of the entire system and require an increase in the diameters of the front lenses.

Condition (5) is requirements to maintain at an appropriate level the combined focal lengths of first lens unit Gr1 and second lens unit Gr2 in the shortest focal length condition in a five-component zoom lens system comprising lens units that are aligned to be positive, negative, positive, positive and negative in terms of refractive power. If the upper limit of condition (5) is exceeded, the combined focal lengths of first lens unit Gr1 and second lens unit Gr2 becomes too short, and therefore the back focus would decrease, which would lead to an increase in the diameters of the rear lenses. If the lower limit of condition (5) is not exceeded, the combined focal lengths of first lens unit Gr1 and second lens unit Gr2 becomes too long, and therefore the back focus would increase, which would lead to an increase in the length of the entire system and make the correction of spherical aberration difficult.

In a five-component zoom lens system comprising lens units that are aligned to be positive, negative, positive, positive and negative in terms of refractive power, an effective reduction in the number of lenses and aberration correction become possible by using aspherical surfaces in second lens unit Gr2 and fifth lens unit Gr5. By having an aspherical surface in second lens unit Gr2, distortion and curvature of field in the wide angle range can be essentially corrected with good balance. By having an aspherical surface in fifth lens unit Gr5, spherical aberration and peripheral coma aberration in the telephoto range can be essentially corrected with good balance.

In addition, an addition of a lens system having a small refractive power in front of the first lens unit, behind the fifth lens unit, or between the first and the fifth lens unit of the zoom lens system pertaining to the present invention will not cause the zoom lens system to deviate from the essence of the present invention.

FIGS. 4A through 4C, 7A through 7C and 10A through 10C show aberrations of the first through third embodiments, respectively, in the shortest focal length condition (W).

FIGS. 5A through 5C, 8A through 8C and 11A through 11C show aberrations of the first through third embodiments, respectively, in the middle focal length condition (M).

FIGS. 6A through 6C, 9A through 9C and 12A through 12C show aberrations of the first through third embodiments, respectively, in the longest focal length condition (T).

In the, drawings indicating spherical aberration, and sine conditions, solid line (d) represents the spherical aberration with regard to the d-line and dotted line (SC) represents the sine conditions. In the drawings indicating astigmatism, dotted line (DM) represents the curvature of field of meridional light rays and solid line (DS) represents the curvature of field of sagittal light rays.

Furthermore, table 7 shows values in the first through third embodiments that correspond to conditions (1) through (5) described above.

Although the present invention has been described and illustrated in detail, it is clearly understood that the same in by way of illustration and examples only and is not to be taken by way of limitation, the spirit and scope of the present invention being limited only by terms of the appended claims.

TABLE 1

(EMBODIMENT 1)
f = 22.5~70.0~215.0    FNO = 4.6~6.2~7.2

| | radius of curvature | | axial distance | | refractive index | | Abbe number |
|---|---|---|---|---|---|---|---|
| r1 | 99.850 | | | | | | |
| | | d1 | 1.400 | N1 | 1.83350 | ν1 | 21.00 |
| r2 | 66.007 | | | | | | |
| | | d2 | 6.650 | N2 | 1.49310 | ν2 | 83.58 |
| r3 | −324.044 | | | | | | |
| | | d3 | 0.050 | | | | |
| r4 | 37.853 | | | | | | |
| | | d4 | 4.650 | N3 | 1.49310 | ν2 | 83.58 |
| r5 | 113.497 | | | | | | |
| | | d5 | 1.500~21.164~38.275 | | | | |
| r6* | 113.497 | | | | | | |
| | | d6 | 1.000 | N4 | 1.77250 | ν4 | 49.77 |
| r7 | 14.386 | | | | | | |
| | | d7 | 3.850 | | | | |
| r8 | −128.317 | | | | | | |
| | | d8 | 0.900 | N5 | 1.77250 | ν5 | 49.77 |
| r9 | 48.102 | | | | | | |
| | | d9 | 0.100 | | | | |
| r10 | 17.537 | | | | | | |
| | | d10 | 2.650 | N6 | 1.83350 | ν6 | 21.00 |
| r11 | 91.026 | | | | | | |
| | | d11 | 2.050 | | | | |
| r12 | −19.674 | | | | | | |
| | | d12 | 0.800 | N7 | 1.75450 | ν7 | 51.57 |
| r13 | 2814.206 | | | | | | |
| | | d13 | 18.120~9.035~0.640 | | | | |
| r14 | INF | | | | | | |
| | | d14 | 0.800 | | | | |
| r15 | 12.833 | | | | | | |
| | | d15 | 5.200 | N8 | 1.49310 | ν8 | 83.58 |
| r16 | −36.119 | | | | | | |
| | | d16 | 0.050 | | | | |
| r17 | 16.015 | | | | | | |
| | | d17 | 3.200 | N9 | 1.49310 | ν9 | 83.58 |
| r18 | 45.034 | | | | | | |
| | | d18 | 1.500 | | | | |
| r19* | −21.406 | | | | | | |
| | | d19 | 0.900 | N10 | 1.83400 | ν10 | 37.05 |
| r20* | 52.995 | | | | | | |
| | | d20 | 5.200~0.300~2.300 | | | | |
| r21 | 36.567 | | | | | | |
| | | d21 | 3.400 | N11 | 1.48749 | ν11 | 70.44 |
| r22 | −16.529 | | | | | | |
| | | d22 | 0.900 | N12 | 1.83350 | ν12 | 21.00 |
| r23 | −19.728 | | | | | | |
| | | d23 | 6.900~4.200~1.000 | | | | |
| r24* | −292.342 | | | | | | |
| | | d24 | 2.600 | N13 | 1.84666 | ν13 | 23.82 |
| r25* | −40.069 | | | | | | |
| | | d25 | 0.800 | | | | |
| r26 | −22.229 | | | | | | |
| | | d26 | 1.200 | N14 | 1.75450 | ν14 | 51.57 |
| r27 | 204.433 | | | | | | |

TABLE 2

Aspherical surface coefficients r6: ε = 1.000000
A4 = 2.32610E-06
A6 = 1.11630E-07
A8 = −9.42970E-10
A10 = 5.71110E-12
A12 = −9.64010E-15 r19: ε = 1.000000
A4 = −3.35610E-05
A6 = 2.65710E-07
A8 = 1.88140E-09
A10 = −1.44210E-11
A12 = −2.05640E-13 r20: ε = 1.000000
A4 = 6.12480E-05
A6 = 5.17880E-07
A8 = 2.68050E-10
A10 = 8.75430E-12
A12 = 1.38160E-13 r24: ε = 1.000000
A4 = −4.57350E-05
A6 = −7.06440E-07
A8 = −9.61040E-09
A10 = 8.12870E-12
A12 = −1.24470E-13 r25: ε = 1.000000
A4 = −2.06770E-05
A6 = −6.37790E-07
A8 = −3.10280E-09
A10 = −6.17970E-11
A12 = 6.07360E-13

TABLE 3

(EMBODIMENT 2)
f = 22.5~70.0~215.0    FNO = 4.6~6.2~7.2

| | radius of curvature | | axial distance | | refractive index | | Abbe number |
|---|---|---|---|---|---|---|---|
| r1 | 73.195 | | | | | | |
| | | d1 | 0.963 | N1 | 1.83350 | ν1 | 21.00 |
| r2 | 56.074 | | | | | | |
| | | d2 | 9.333 | N2 | 1.49310 | ν2 | 83.58 |
| r3 | −672.875 | | | | | | |
| | | d3 | 0.100 | | | | |
| r4 | 46.724 | | | | | | |
| | | d4 | 4.952 | N3 | 1.49310 | ν2 | 83.58 |
| r5 | 119.226 | | | | | | |
| | | d5 | 1.909~22.988~40.004 | | | | |
| r6* | 53.326 | | | | | | |
| | | d6 | 0.800 | N4 | 1.77250 | ν4 | 49.77 |
| r7 | 13.825 | | | | | | |
| | | d7 | 5.620 | | | | |
| r8 | −39.384 | | | | | | |
| | | d8 | 0.800 | N5 | 1.77250 | ν5 | 49.77 |
| r9 | 143.656 | | | | | | |
| | | d9 | 0.100 | | | | |
| r10 | 22.730 | | | | | | |
| | | d10 | 2.585 | N6 | 1.83350 | ν6 | 21.00 |
| r11 | 537.042 | | | | | | |
| | | d11 | 1.624 | | | | |
| r12 | −24.193 | | | | | | |
| | | d12 | 0.800 | N7 | 1.75450 | ν7 | 51.57 |
| r13 | 177.826 | | | | | | |
| | | d13 | 20.469~9.308~0.700 | | | | |
| r14 | INF | | | | | | |
| | | d14 | 0.800 | | | | |
| r15 | 12.696 | | | | | | |
| | | d15 | 4.437 | N8 | 1.48749 | ν8 | 70.44 |
| r16 | −37.895 | | | | | | |
| | | d16 | 0.100 | | | | |
| r17 | 15.832 | | | | | | |
| | | d17 | 3.241 | N9 | 1.48749 | ν9 | 70.44 |
| r18 | 42.152 | | | | | | |
| | | d18 | 1.510 | | | | |
| r19* | −22.724 | | | | | | |
| | | d19 | 4.075 | N10 | 1.83400 | ν10 | 37.05 |
| r20* | 53.768 | | | | | | |
| | | d20 | 4.635~0.437~0.300 | | | | |
| r21 | 25.990 | | | | | | |
| | | d21 | 3.287 | N11 | 1.48749 | ν11 | 70.44 |

TABLE 3-continued (EMBODIMENT 2)
f = 22.5~70.0~215.0    FNO = 4.6~6.2~7.2

| | radius of curvature | | axial distance | | refractive index | | Abbe number |
|---|---|---|---|---|---|---|---|
| r22 | −18.367 | | | | | | |
| | | d22 | 4.942 | N12 | 1.83350 | v12 | 21.00 |
| r23 | −26.858 | | | | | | |
| | | d23 | 4.821~4.277~2.437 | | | | |
| r24* | −30.400 | | | | | | |
| | | d24 | 1.522 | N13 | 1.84666 | v13 | 23.82 |
| r25* | −20.740 | | | | | | |
| | | d25 | 0.689 | | | | |
| r26 | −14.377 | | | | | | |
| | | d26 | 0.800 | N14 | 1.75450 | v14 | 51.57 |
| r27 | −32.160 | | | | | | |

TABLE 4

Aspherical surface coefficients r6: ε = 1.000000
A4 = 2.95180E-06
A6 = 6.11480E-08
A8 = −9.42970E-10
A10 = 5.69770E-12
A12 = −1.10470E-14 r19: ε = 1.000000
A4 = −3.02470E-05
A6 = 2.22460E-07
A8 = 2.29920E-10
A10 = −1.43830E-11
A12 = −4.62780E-13 r20: ε = 1.000000
A4 = 5.52610E-05
A6 = 4.34800E-07
A8 = 1.07800E-09
A10 = 4.07770E-11
A12 = 1.71090E-12 r24: ε = 1.000000
A4 = −5.22330E-05
A6 = −6.07160E-07
A8 = −5.51630E-09
A10 = 4.41530E-11
A12 = −7.26590E-14 r25: ε = 1.000000
A4 = −3.02500E-05
A6 = −5.41830E-07
A8 = −4.20160E-10
A10 = −4.46150E-11
A12 = 3.72000E-13

TABLE 5

(EMBODIMENT 3)
f = 22.5~65.0~160.0    FNO = 4.6~6.2~7.2

| | radius of curvature | | axial distance | | refractive index | | Abbe number |
|---|---|---|---|---|---|---|---|
| r1 | 81.930 | | | | | | |
| | | d1 | 4.233 | N1 | 1.83350 | v1 | 21.00 |
| r2 | 59.272 | | | | | | |
| | | d2 | 8.416 | N2 | 1.49310 | v2 | 83.58 |
| r3 | −508.226 | | | | | | |
| | | d3 | 0.100 | | | | |
| r4 | 42.314 | | | | | | |
| | | d4 | 4.849 | N3 | 1.49310 | v2 | 83.58 |

TABLE 5-continued (EMBODIMENT 3)
f = 22.5~65.0~160.0    FNO = 4.6~6.2~7.2

| | radius of curvature | | axial distance | | refractive index | | Abbe number |
|---|---|---|---|---|---|---|---|
| r5 | 127.549 | | | | | | |
| | | d5 | 1.535~19.169~32.331 | | | | |
| r6* | 56.729 | | | | | | |
| | | d6 | 0.800 | N4 | 1.77250 | v4 | 49.77 |
| r7 | 13.802 | | | | | | |
| | | d7 | 5.572 | | | | |
| r8 | −32.726 | | | | | | |
| | | d8 | 2.391 | N5 | 1.77250 | v5 | 49.77 |
| r9 | 198.807 | | | | | | |
| | | d9 | 0.896 | | | | |
| r10 | 29.251 | | | | | | |
| | | d10 | 2.533 | N6 | 1.83350 | v6 | 21.00 |
| r11 | −160.659 | | | | | | |
| | | d11 | 1.231 | | | | |
| r12 | −22.548 | | | | | | |
| | | d12 | 2.188 | N7 | 1.75450 | v7 | 51.57 |
| r13 | −819.679 | | | | | | |
| | | d13 | 17.712~7.150~0.700 | | | | |
| r14 | INF | | | | | | |
| | | d14 | 0.800 | | | | |
| r15 | 12.796 | | | | | | |
| | | d15 | 5.311 | N8 | 1.48749 | v8 | 70.44 |
| r16 | −36.857 | | | | | | |
| | | d16 | 0.100 | | | | |
| r17 | 15.851 | | | | | | |
| | | d17 | 3.245 | N9 | 1.48749 | v9 | 70.44 |
| r18 | 42.707 | | | | | | |
| | | d18 | 1.394 | | | | |
| r19* | −22.205 | | | | | | |
| | | d19 | 4.303 | N10 | 1.83400 | v10 | 37.05 |
| r20* | 45.319 | | | | | | |
| | | d20 | 3.854~0.544~0.491 | | | | |
| r21 | 27.251 | | | | | | |
| | | d21 | 3.360 | N11 | 1.48749 | v11 | 70.44 |
| r22 | −16.437 | | | | | | |
| | | d22 | 3.306 | N12 | 1.83350 | v12 | 21.00 |
| r23 | −24.971 | | | | | | |
| | | d23 | 6.194~5.269~4.095 | | | | |
| r24* | −34.642 | | | | | | |
| | | d24 | 1.766 | N13 | 1.84666 | v13 | 23.82 |
| r25* | −20.952 | | | | | | |
| | | d25 | 1.309 | | | | |
| r26 | −14.232 | | | | | | |
| | | d26 | 0.800 | N14 | 1.75450 | v14 | 51.57 |
| r27 | −29.523 | | | | | | |

TABLE 6

Aspherical surface coefficients r6: ε = 1.000000
A4 = 6.68820E-06
A6 = 4.55990E-08
A8 = −9.42970E-10
A10 = 6.30930E-12
A12 = −1.33740E-14 r19: ε = 1.000000
A4 = −3.13960E-05
A6 = 1.86070E-07
A8 = −4.57370E-10
A10 = −2.14060E-11
A12 = 4.90370E-13 r20: ε = 1.000000
A4 = 5.56930E-05
A6 = 4.08600E-07
A8 = 8.79460E-10
A10 = 3.35350E-11
A12 = 1.19520E-12

TABLE 6-continued

Aspherical surface coefficients r24: ε = 1.000000
A4 = -4.89090E-05
A6 = -5.34470E-07
A8 = -4.75140E-09
A10 = 2.68430E-11
A12 = -2.27340E-13 r25: ε = 1.000000
A4 = -3.41900E-05
A6 = -5.44090E-07
A8 = -3.46600E-10
A10 = -4.10010E-11
A12 = 1.12740E-13

TABLE 7

|  | CONDITIONS | | | | |
| --- | --- | --- | --- | --- | --- |
|  | (1) | (2) | (3) | (4) | (5) |
| EMBODIMENT 1 | -0.176 | -0.580 | 1.67 | 0.455 | -0.853 |
| EMBODIMENT 2 | -0.165 | -0.591 | 1.54 | 0.449 | -0.883 |
| EMBODIMENT 3 | -0.170 | -0.577 | 1.39 | 0.542 | -0.872 |

What is claimed is:

1. A zoom lens system comprising, from the object side:

a first lens unit having a positive refractive power;

a second lens unit having a negative refractive power;

a third lens unit having a positive refractive power;

a fourth lens unit having a positive refractive power, said fourth lens unit being provided at the image side of said third lens unit; and a fifth lens unit have a negative refractive power, wherein all of the lens units move toward the object and the distance between the fourth lens unit and fifth lens unit decreases during zooming from the shortest focal length condition toward the longest focal length condition, and wherein said zoom lens system meets the following conditions:

$-0.30 < f2/f1 < -0.10$ $-0.75 < f2/fw < -0.40$ $1.25 < \beta 5T/\beta 5W < 1.67$ where, f1: focal length of the first lens unit;

f2: focal length of the second lens unit;

fw: shortest focal length of the entire system;

β5T: horizontal magnification of the fifth lens unit in the longest focal length condition; and β5W: horizontal magnification of the fifth lens unit in the shortest focal length condition.

2. The zoom lens system as claimed in claim 1, wherein said second lens unit has at least one aspherical surface.

3. The zoom lens system as claimed in claim 1, wherein said fifth lens unit has at least one aspherical surface.

4. A zoom lens system comprising, from the object side:

a first lens unit having a positive refractive power;

a second lens unit having a negative refractive power;

third lens unit having a positive refractive power;

a fourth lens unit having a positive refractive power, said fourth lens unit being provided at the image side of said third lens unit; and a fifth lens unit having a negative refractive power, wherein all of the lens units move toward the object and the distance between the fourth lens unit and fifth lens unit decreases during zooming from the shortest focal length condition toward the longest focal length condition, and wherein said zoom lens system meets the following conditions.

$-0.30 < f2/f1 < -0.10$ $1.25 < \beta 5T/\beta 5W < 1.67$ $0.25 < (\beta 5T \cdot \beta 2W)/(\beta 2T \cdot 5W) < 0.65$ $-1.20 < f12W/fw < -0.60$ where, f1: focal length of the first lens unit;

f2: focal length of the second lens unit;

fw: shortest focal length of the entire system;

β5T: horizontal magnification of the fifth lens unit in the longest focal length condition;

β5W: horizontal magnification of the fifth lens unit in the shortest focal length condition;

β2T: horizontal magnification of the second lens unit in the longest focal length condition;

β2W: horizontal magnification of the second lens unit in the shortest focal length condition; and f12W: combined focal lengths of the first lens and the second lens unit in the shortest focal length condition.

5. The zoom lens system as claimed in claim 4, wherein said second lens unit has at least one aspherical surface.

6. The zoom lens system as claimed in claim 4, wherein said fifth lens unit has at least one aspherical surface.

7. A zoom lens system comprising, from the object side:

a first lens unit having a positive refractive power;

a second lens unit having a negative refractive power;

a third lens unit having a positive refractive power;

a fourth lens unit having a positive refractive power, said fourth lens unit being provided at the image side of said third lens unit; and a fifth lens unit having a negative refractive power, wherein all of the lens units move toward the object and the distance between the fourth lens unit and fifth lens unit decreases during zooming from the shortest focal length condition toward the shortest focal length condition, and wherein said zoom lens system meets the following conditions:

$-0.30 < f2/f1 < -0.10$ $-0.75 < f2/fw < -0.40$ $0.25 < (\beta 5T \cdot \beta 2W)/(\beta 2T \cdot \beta 5W) < 0.65$ where, f1: focal length of the first lens unit;

f2: focal length of the second lens unit;

fw: shortest focal length of the entire system;

$\beta$5T: horizontal magnification of the fifth lens unit in the longest focal length condition;

$\beta$5W: horizontal magnification of the fifth lens unit in the shortest focal length condition;

$\beta$2T: horizontal magnification of the second lens unit in the longest focal length condition; and $\beta$2W: horizontal magnification of the second lens unit in the shortest focal length condition.

8. The zoom lens system as claimed in claim 7, wherein said second lens unit has at least one aspherical surface.

9. The zoom lens system as claimed in claim 7, wherein said fifth lens unit has at least one aspherical surface.

\* \* \* \* \*